United States Patent
Khaleghi

[11] Patent Number: 6,069,718
[45] Date of Patent: *May 30, 2000

[54] DISTORTION PENALTY MEASUREMENT PROCEDURE IN OPTICAL SYSTEMS USING NOISE LOADING

[75] Inventor: Farideh Khaleghi, Ottawa, Canada

[73] Assignee: Nortel Networks Corporation, Montreal, Canada

[*] Notice: This patent is subject to a terminal disclaimer.

[21] Appl. No.: 08/933,875

[22] Filed: Sep. 19, 1997

[51] Int. Cl.[7] .......................... H04B 10/08; H04B 10/00; G01N 21/00
[52] U.S. Cl. .......................... 359/110; 359/110; 359/161; 359/158; 356/73.1
[58] Field of Search .................... 359/110, 161, 359/158; 356/73.1

[56] References Cited

U.S. PATENT DOCUMENTS

| | | | |
|---|---|---|---|
| 4,799,790 | 1/1989 | Tsukamoto et al. | 356/73.1 |
| 4,823,360 | 4/1989 | Tremblay et al. | 375/4 |
| 5,585,954 | 12/1996 | Taga et al. | 359/158 |
| 5,623,355 | 4/1997 | Olsen | 359/110 |
| 5,631,759 | 5/1997 | Bogdan et al. | 359/189 |
| 5,825,521 | 10/1998 | Ogawa et al. | 359/161 |

*Primary Examiner*—Jason Chan
*Assistant Examiner*—Mohammad Sedighian
*Attorney, Agent, or Firm*—Aprilia U. Diaconescu

[57] ABSTRACT

The BER is used as a parameter for evaluating the performance of an optical transmission system. Performance of optical systems is also defined by the Q factor, which uniquely determines the BER in the absence of distortion. The measurements are effected in a point of operation of the channel which gives a value of interest for the Q factor. To this end, the optical SNR is lowered by adding noise over the information signal. A distortion-free Q ($Q_{DF}$) and a back-to-back Q ($Q_{BB}$) are determined in the same operating point of the system. The distortion penalty for transmitter-receiver pair may be determined by comparing $Q_{DF}$ to $Q_{BB}$. The noise loading technique will allow to investigate if equalizing. The value of OSNRs at the output of a particular system results in equalizing the noise margin in that systems or not.

21 Claims, 4 Drawing Sheets

DISTORTION PENALTY MEASUREMENT PROCEDURE IN OPTICAL SYSTEMS USING NOISE LOADING

BACKGROUND OF THE INVENTION

1. Field of the Invention

This invention is directed to a performance evaluation analysis in optical systems, and more particularly to a distortion measurement procedure using noise loading.

2. Background of the Invention

Optical signals suffer degradation between the transmitter and receiver from such factors as noise, inter-symbol interference, fiber dispersion, non-linearity of the elements and transmission medium, etc. In addition, in amplified wavelength division multiplexed (WDM) systems, the transmission characteristics vary from one channel to another due to the non-flat gain and noise profile of erbium-doped fiber amplifiers (EDFAs).

Distortion is defined as any inaccurate replication of a signal transmitted over a communication link, and could be referred to any network element (NE) along the link. It can be measured by assessing the difference between the wave shape of the original signal and that of the signal at the network element of interest, after it has traversed the transmission link.

In the last decade, transmission rates of data signals have increased progressively, which demands faster and more sensitive transmission systems. For transmission at high rates, such as 40 or 80 Gb/s, the distortion of the optical link is a critical parameter. With various types of dispersion shifted fiber, dispersion compensating fiber and dispersion compensating filters that make up a given link, determining distortion is no longer a simple operation, especially in optical transmission systems with in-line optical amplifiers. System performance degradation caused by noise and optical path distortions are usually difficult to separate, making the performance evaluation complicated.

In the evaluation of the characteristics of an optical fiber communication system, the bit error rate (BER) has usually been used as a parameter for performance evaluation. BER is defined as the ratio between the number of the erroneously received bits to the total number of bits received over a period of time (a second). A number of codes have been provided in the signal at transmitter for error detection, the basic idea being to add redundant bits to the input data stream over a known number of bits. The BER calculated by the receiver includes information on all impairments suffered by the signal between the transmitter and receiver, i.e. both noise and distortion information.

Performance of an optical system is also defined by a parameter called Q. The Q value indicates the signal-to-noise ratio of the electric signal regenerated by the optical receiver, and is defined as follows:

$$Q = \frac{\mu_m - \mu_s}{\sigma_m + \sigma_s} \quad (1)$$

where $\mu_m$ is the mean value of the '1's, $\mu_s$ is the mean value of the '0's, $\sigma_m$ is the standard deviation of the level of '1's, and $\sigma_s$ is the standard deviation of the level of '0's. In the absence of distortion, Q entirely represents the bit error rate (BER) performance of the system, and this property is used in the present invention.

Optical systems have very low BERs under nominal condition of operation, and therefore measurement of BER is time consuming. In a system having a transmission rate of 5 GB/s for instance, a minimum of six hours is needed to measure a BER of $10^{-14}$ or below. It is also evident that the BER may vary significantly during this long period of time. Thus, if the BER decreases to $10^{-10}$ for a short period even, the mean value of the BER over the above six hours will never reach $10^{-14}$, making the measurement unreliable.

U.S. Pat. No. 5,585,954 (Taga et al., issued Dec. 17, 1996 and assigned to Kokusai Denshin Kabushiki Kaisha) discloses a method for measuring the Q factor as a performance evaluation parameter for a transmission system. The performance evaluation according to this patent is based on the assumption that there is a one-to-one correspondence between BER and Q at the decision threshold (reference voltage) for an optimum BER. However, the patent does not account for the distortion, and also is concerned with reducing the time necessary for measuring Q and obtaining real-time Q values, rather than to separating the noise and distortion contributions to the errors along a transmission path.

Signal-to-noise ratio (SNR) is a parameter that represents noise only characteristics of a system. In non-optical systems, where envelope-detection (square-law detection) is not necessary, the noise is generally independent of the signal level, and as such, in the absence of distortion, SNR is the only determining parameter for BER performance of the system. In these systems, an AGC (automatic gain controller) may be used to compensate for variations in the received power.

On the other hand, in optical systems, because of the square-law detection effected at the receiver, there are some signal-dependent noise components, so that the optical SNR (OSNR) depends on the signal level. As such, the BER of optical systems depends not only on the OSNR, but also on the signal, i.e. on the level of the received power. Even when an equivalent optical AGC is used, the BER performance of the system is not completely independent of the received optical power. The present invention accounts for this dependency by effecting all measurements of BER and OSNR for the same power of the signal.

There are several test instruments available for measuring the extent of signal degradation using an eye closure diagram. An eye closure diagram is the graphic pattern produced on an oscilloscope when a baseband signal is applied to the vertical input of the oscilloscope and the symbol rate triggers the instrument time base. For a binary signal, such an eye diagram has a single eye which is open or closed to an extent determined by the signal degradation. An open pattern is desired. Changes in the eye size indicate inter-symbol interference, amplitude irregularities, or timing problems, such as jitters, depending on the signal that is measured.

For example, U.S. Pat. No. 4,823,360 (Tremblay et al., issued Apr. 18, 1989 and assigned to Northern Telecom Limited) discloses a device for measuring chromatic dispersion of an optical fiber based on a baseband phase comparison method. The device described in this U.S. patent evaluates the transmission link performance using three threshold levels for recovering data. Two of the thresholds are obtained by measuring the level of "long 0s" and "long 1s", respectively, for a preset error rate, and the third threshold is provided in a selected relationship to the other two.

U.S. Pat. No. 4,799,790 (Tsukamoto et al., issued Jan. 24, 1989 and assigned to Anritsu Corporation) discloses a device comprising a transmitter for launching signals of various wavelengths into a reference or test fiber, and a receiver. At the receiver, the phase difference between two adjacent wavelengths is measured for both the reference and test paths for determining the delay of the respective wavelength.

None of these U.S. patents is concerned with providing a distortion measurement procedure that is simple to implement and gives a reliable measure of the contribution of the distortion to the performance.

SUMMARY OF THE INVENTION

It is an object of the present invention to provide a performance evaluation method for an optical transmission system that alleviates totally or in part the drawbacks of the prior art methods.

It is another object of the present invention to provide a rapid and reliable method for determining the Q of transmission path, link and transmitter-receiver pair.

Another object of the present invention is to provide a simple and reliable method for measuring the distortion penalty for a transmission path in an operating point of interest. For example, the measurements may be effected in an operating point where the system is expected to fail (Q=7), corresponding to a BER floor of a $10^{-12}$.

Another object of the invention is to provide, a distortion penalty measurement technique which separates the contribution of distortion from the contribution of noise in the BER. This is accomplished by estimating the Q corresponding to the BER value measured in a certain operating point, and comparing it to a distortion-free Q measured in the same operating point The distortion-free Q may also be computed in the same operating point, using a model adopted for the receiver.

It is still another object of the present invention to provide a distortion penalty measurement technique based on noise loading of a signal at the output of the transmission link, for replicating any operating conditions of interest.

Accordingly, a method for measuring the distortion penalty imposed on an information signal travelling on an optical transmission path of a transmitter, a receiver, and a transmission link, the method comprising the steps of lowering the Q-factor of said transmission path to a value of interest $Q_O$, determining an operating point (OP) for the transmission path, in the OP, measuring a first parameter including information on errors in said information signal due to the noise cumulated along the path, in the OP, measuring a second parameter including information on errors in the information signal due to the noise cumulated along the path and to distortion introduced by the transmitter and the receiver, and calculating a pair distortion penalty ($D_{TR}$) for the receiver and the transmitter by comparing said first parameter with the second parameter.

Another advantage according the measurement technique of the invention is that distortion penalty is measured in the presence of the ASE (amplified spontaneous emission) noise. For example, under the real operating conditions, where OSNR is low, the power of the noise contributed by e.g. XPM (cross phase modulation) is negligible compared to the power of noise introduced by ASE. Because the ASE noise is predominant in the OSNR, the value of distortion penalty determined using the techniques of the invention is not over-estimated.

Still another advantage of the invention is that measurements in the operating point (OP) corresponding to a Q of 7, where the system has a BER floor of $10_{-12}$, provide significant information on how to perform the equalization of the channels of a WDM transmission system. Due to non-linear gain profile of the optical amplifiers, the co-propagating channels do not necessarily have a same OSNR for the same BER performance. Equalizing BERs (or equivalent Q values), do not necessarily result in similar noise margins for all channels. However, all channels operate more or less with the same OSNR value in the operating point of Q=7, due to the ASE noise dominance. Thus, similar noise margins may be obtained for all channels by equalizing the OSNRs in this operating point. dr

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

Figure 1A:
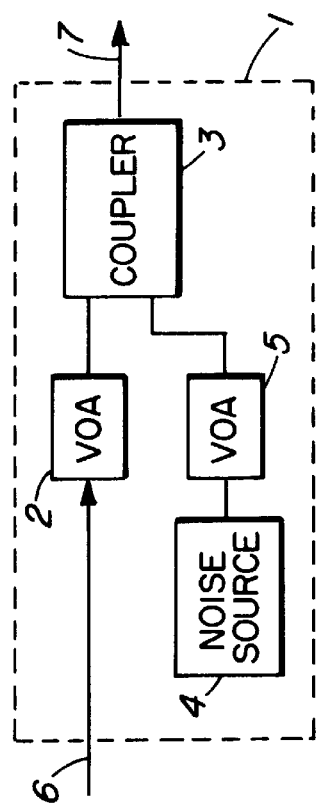
FIG. 1A is a block diagram of the distortion measurement unit according to the invention.

Definition of some of the terms used throughout this specification is given next for a better understanding of the invention.

In general, all non-linear effects, such as self-phase modulation (SPM), four-wave mixing (FWM), cross phase modulation (XPM) and modulation instability (MI), as well as amplified spontaneous emission (ASE) noise and dispersion contribute together to lowering the performance of an optical system and affect the value of BER. The distortion penalty measurement technique according to this invention is based on the fact that many distortion components, such as XPM, MI, SFM, manifest themselves as optical phase noise and do not affect the value of OSNR.

While by definition distortion measures changes in the shape of a signal, rather than changes in the power level, experiments conducted in the laboratory over different links and with different transmitter-receiver pairs, indicate that the distortion penalty depends upon the level of OSNR. On the other hand, it is known that the BER of optical systems depends not only on the OSNR, but also on the signal, i.e. on the level of the received power. As such, distortion penalty in an optical communications system is a function of the operating point of the respective channel. To account for this finding, all measurements were performed in the same operating point of the transmission channel.

The operating point (OP) of a channel is defined herein by the value of the signal power ($P_O$) at the input of the receiver and the Q value ($Q_O$) measured at the output of the receiver. The operating point of a channel is designed herein by OP.

'Noise loading' measurement technique comprises increasing the ASE noise content of a signal travelling on channel $\lambda_i$, for positioning the operating point to an $OSNR_O$ value corresponding to $Q_O$. This method allows performing all measurements in the same $OP_i$ for a given channel $\lambda_i$.

Measurement of the BER parameter for a transmission channel is performed, according to the invention, using a graphic estimation on BER-voltage (BERV). The term 'estimated' is used in the following for the values obtained using the BERV diagrams.

In a BERV diagram, the BER is plotted against different values of the reference voltage ($V_{Ref}$), or decision threshold voltage, for which the BER is measured during a reasonable period of time. $V_{Ref}$ is the voltage level used by the receiver to decode the input signal as a logic '1' when the signal is greater than $V_{Ref}$, and to decode the input signal as a logic '0' when the signal is less than $V_{Ref}$. Since the distribution of noise is Gaussian, a linear extrapolation of the flanks of the BERV diagram gives a good estimate for the BER. The period of time used for the measurements disclosed in this specification was 5 to 10 minutes.

Generally, if the BER performance of a channel at the output of a system is known, the value of Q can be estimated by formula:

$$Q^2 = 4.452 \log\left(\frac{0.1235}{BER}\right) \quad (2)$$

Formula (2) is used throughout the present specification for calculating the value of Q for a BER measured at the output of the receiver $R_i$ for the operating point ($OP_i$) of the respective channel $\lambda_i$. A distortion free Q ($Q_{DF}$) is also calculated using a BER measured for the same operating point, using a test signal of "'long 1's'" and "'long 0's'".

The modified BERV diagrams used in this invention are plots of Q against the reference voltage, the Q values being calculated for the corresponding values of the BER, using formula (2).

FIG. 1A illustrates a distortion measurement unit (DMU) 1 according to the invention. Unit 1 comprises a coupler 3, which couples the output of a first variable optical attenuator (VOA) 2 to output 7. VOA 2 is used to vary or adjust the power level of the signal on input 6 to a desired value on output 7. DMU 1 also comprises a noise source 4 and a second VOA 5 used for controlling the power of the noise generated by source 4. VOA 5 is also connected to the input of coupler 3, and noise of a desired power is obtained at output 7. Noise source 4 could be an optical amplifier which, in the absence of an input signal, outputs ASE noise only.

Figure 1B:
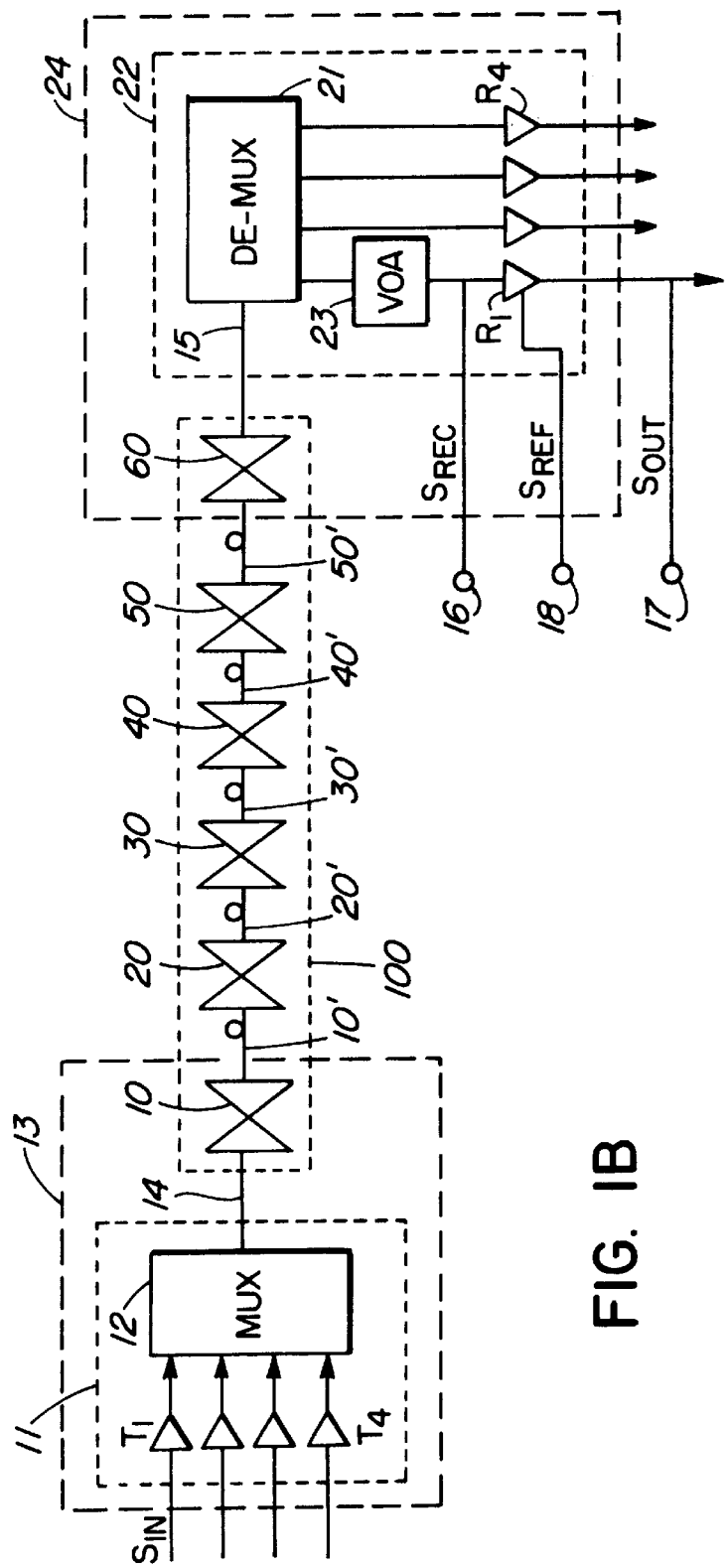
FIG. 1B is a schematic of a multi-span multichannel optical transmission system showing the points of measurement for measuring BER, P and OSNR.

FIG. 1B illustrates a block diagram of a typical 5-span, 4-wavelength unidirectional transmission system (i=4) used for the measurements according to the invention. It is to be understood that the invention is not restricted to systems as that illustrated herein, but also applies to systems having more or less spans and channels, and also to unidirectional systems.

Each transmitter $T_i$ 11 at the transmitter site 13, communicates with a corresponding receiver $R_i$ 22 at the receiver site 24, over a channel characterized by the wavelength of the optical carrier ($\lambda_i$).

The four signals, each corresponding to a channel $\lambda_i$, are mixed by a multiplexer 12 prior to insertion on fiber 14. The multi-channel signal is amplified by a post-amplifier 10 and then is transmitted over line amplifiers 20, 30, 40, and 50, series connected by spans 10', 20', 30', 40', and 50', respectively. At site 24, the multichannel signal is first amplified in preamplifier 60, and separated in individual channel signals in a demultiplexer 21 according to their wavelength $\lambda_i$. The signals for each channel are then applied to a respective receiver $R_i$ for decoding.

A variable optical amplifier VOA 23 is provided at the input of receiver $R_1$ for controlling the level of the received power ($P_O$), as needed for the measurements according to the invention.

The term 'transmission link' or 'link' is used in this specification for designating the amplifiers and fiber spans enclosed in the dotted-line box 100. The term 'transmission path' is used in this specification for designating the equipment and fiber spans between a transmitter $T_i$ and a corresponding receiver $R_i$, including the transmitter and the receiver. The term 'transmitter-receiver pair' is used to designate a transmitter $T_i$ and a receiver $R_i$, which are linked in a particular application over channel $\lambda_i$, but it does not include the equipment and fiber spans connecting $T_i$ to $R_i$.

The term 'output point' is used to designate the output of receiver $R_i$ such as is point 17 on FIG. 1 for channel $\lambda_1$. Operating point OP for channel $\lambda_1$ is defined by $P_O$ and $OSNR_O$ values measured at the input of the receiver $R_1$, shown at 16. OP is set according to this invention by adjusting the power of the signal $P_O$ and adjusting the $OSNR_O$ to obtain a value of Q factor in the vicinity of a value of interest, noted here with $Q_O$.

The BER measured for the current $OP_1$ of the channel $\lambda_1$ ($BER_M$) comprises information on both noise and distortion of the transmission path. The back-to-back BER ($BER_{BB}$) measured in $OP_1$ of channel $\lambda_1$ ($BER_{BB}$) comprises information on the distortion introduced by the $T_1$-$R_1$ pair, and the distortion-free BER ($BER_{DF}$) accounts for noise only errors for the entire path. The $BER_M$, $BER_{BB}$ values are used for determining the corresponding $Q_M$, $Q_{BB}$ values using formula (2) and the distortion-free Q ($Q_{DF}$) is either calculated with formula (2) or determined from the corresponding $BER_{DF}$ value. A comparison between $Q_M$ and $Q_{BB}$ gives the distortion introduced by the link 100. A comparison between $Q_{BB}$ and $Q_{DF}$ gives the distortion introduced by the transmitter-receiver pair, and a comparison between $Q_M$ and $Q_{DF}$ gives the distortion for the entire path.

The noise loading measurement technique according to this invention implies intentionally lowering $OSNR_O$ to obtain a Q factor of interest ($Q_O$). Sometimes, it is desirable to measure the distortion penalty in the vicinity of $Q_O$=7, for equalization of the channels for example. As well, at low OSNRs, distortion is masked by noise. Therefore, distortion penalty must be measured in vicinity of Q=7 which corresponds to low OSNRs.

Figure 2A:
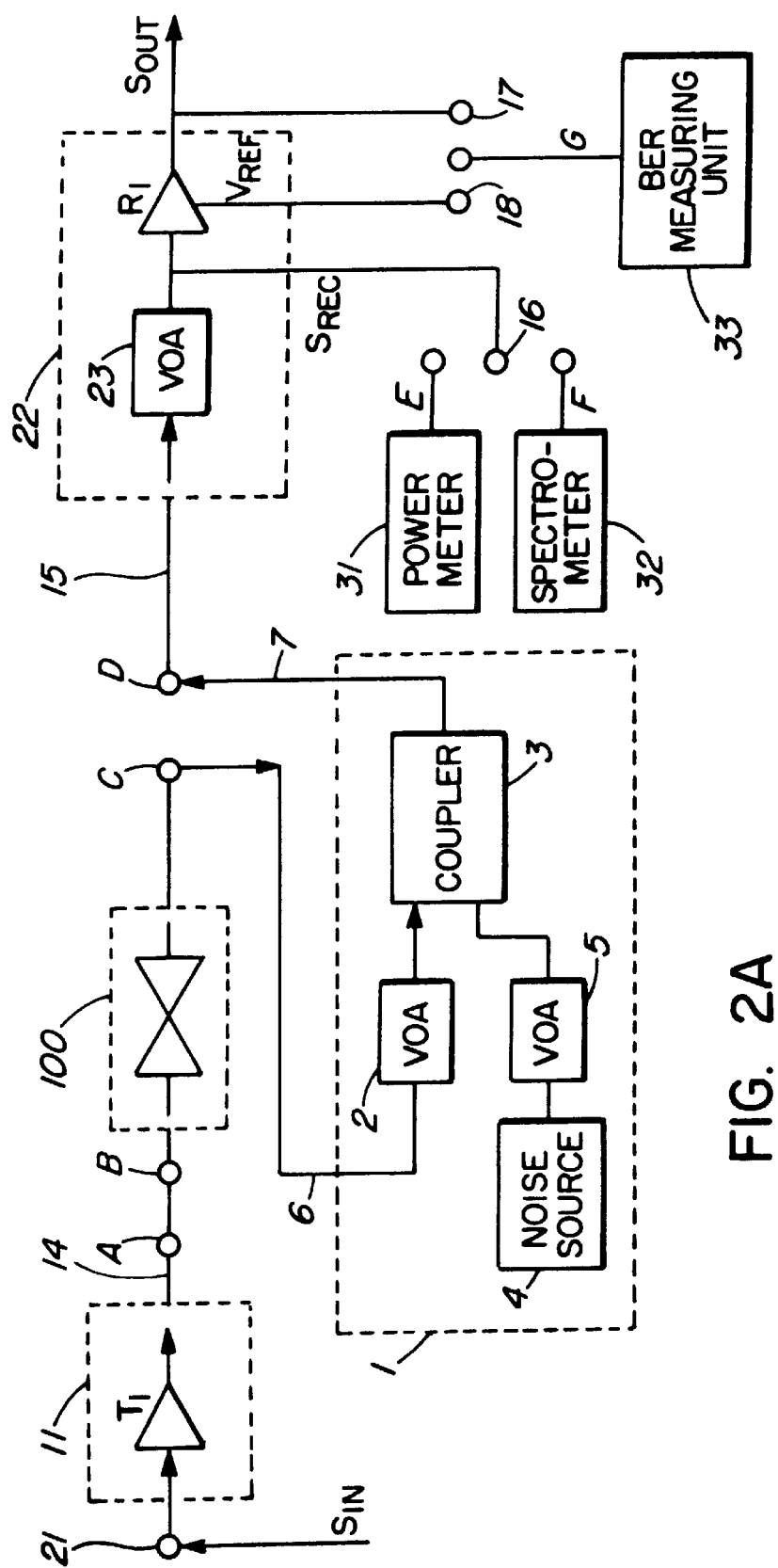
FIG. 2A is a schematic of the measurement technique for determining the Q factor ($Q_M$) in the operating point of the system of FIG. 1B.

FIG. 2A illustrates how the signal at the output of link 100 is noise loaded before arriving at receiver $R_i$. Output C of the link 100 is applied to coupler 3 through VOA 2 and mixed with the noise generated by noise source 4. The output of coupler 3 is connected to input D of the receiver 22.

The measurement technique according to this invention involves determining a BER value or a corresponding Q parameter using BERV diagrams. A BERV diagram is obtained by plotting the values of the BER measured in point 17 as a function of the reference voltage $V_{Ref}$ applied to receiver $R_1$ on terminal 18.

The BER measurements are effected in the known way using a BER measuring unit 33. Output G of the BER measuring unit 33 is connected to point 17, while $V_{Ref}$ is controlled on input 18 in any suitable way. A BER value is then determined graphically on the BERV diagram, and a corresponding Q is calculated using formula (2).

Alternatively, modified BERV diagrams may be used, where a corresponding Q value is calculated with formula (2) for each BER measurement, and a Q–V diagram is plotted for a satisfactory number of points. Q is determined graphically on the Q–V diagram.

For low OSNRS, the Gaussian curve BER=f($V_{Ref}$) can be entirely plotted in a reasonable period of time. However, as OSNR increases, the time needed to measure the BER increases. Therefore, according to this invention the BER, or the equivalent Q determined with formula (2), is determined graphically on an incomplete Q–V diagram, by prolonging the flank of the Gaussian curve. The intersection of these lines gives the BER or Q for the respective operating point ($P_O$, $OSNR_O$). It is to be noted that the Q–V diagram should contain enough points for allowing an accurate estimation for the BER/Q.

The noise loading measurement technique according to this invention involves the following steps, the following steps:

Step 1. The Q-factor of the transmission path is first lowered to a value of interest $Q_O$. This is done by trial and measurement, namely by determining a trial Q factor, designated herein by $Q_T$, comparing $Q_T$ with $Q_O$ and adding noise to the information signal until $Q_T$ is in a predetermined range of $Q_O$. Preferably, the range is ±0.5. All the measurements are effected for a fixed power $P_O$ of the received signal.

The information signal is loaded with noise using the distortion measurement unit of FIG. 1A connected as shown in FIG. 2A.

Step 2. Once a value of Q close to $Q_O$ is obtained, $OSNR_O$ of the operating point $OP_1$ of channel $\lambda_1$ is measured for a power $P_O$ of the received signal. $P_O$ and $OSNR_O$ are measured in the known manner, using power meter 31 and a spectrometer 32 respectively, as shown in FIG. 2A. Namely, output E of power meter 31 and output F of spectrometer 32 are connected to point 16 for the respective measurement.

Step 3. $Q_{DF}$ for the respective transmitter-receiver pair $T_i,R_i$ (i=1 in the example discussed herein) is determined for the operating point $OP_1$. This parameter can be used subsequently for determining the distortion in any point along the transmission link connecting $T_i$ to $R_i$. $Q_{DF}$ can be either calculated or measured.

$Q_{DF}$ can be calculated in software using a model for receiver $R_i$, and this Q is referred to herein as the 'computed $Q_{DF}$'. This requires exact knowledge of the receiver parameters such as noise, bandwidth, and receiver thermal noise. Given a model for the receiver, $P_O$ and $OSNR_O$ entirely determine the performance of the system in the absence of distortion.

Figure 2B:
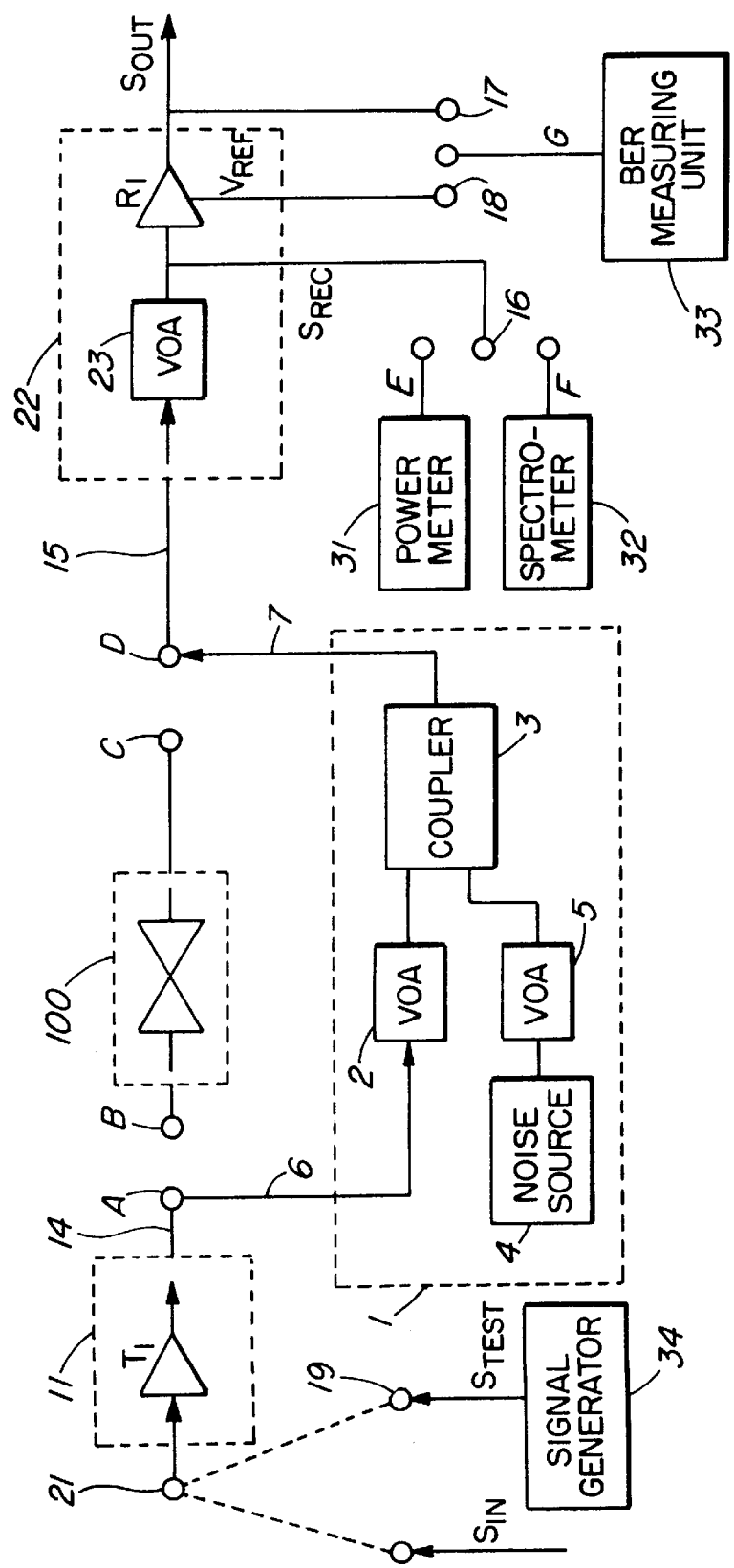
FIG. 2B is a schematic of the measurement technique for estimating the distortion free Q ($Q_{DF}$) and back-to-back Q ($Q_{BB}$) for the system of FIG. 1B.

$Q_{DF}$ can also be estimated, using distortion measurement unit (DMU) 1 connected as illustrated in FIG. 2B. To this end, input 6 of VOA 2 is connected to point A at the output of transmitter unit 11, channel $\lambda_1$, and output 7 of coupler 3 is connected to point D at the input of receiver 22, replacing link 100. By replacing link 100 with DMU 1, the distortion introduced by link 100 is eliminated from the measurement, the only units that introduce errors in the measurement are the transmitter and the receiver.

Wavelength $\lambda_1$ is modulated with a test signal comprising a data stream of 'long 1s' and 'long 0s', received from a signal generator 34, for avoiding data rate distortions. To this end, output 19 of signal generator 34 is applied to the modulating input 21 of transmitter $T_1$, rather than the information signal $S_{IN}$. VOA 23 adjusts the power of the test signal to obtain $P_O$ in point 16. $Q_{DF}$ is determined on a Q–V diagram, obtained as explained above. To summarize, a Q value is calculated with formula (2) for each BER measurement, and a Q–V diagram is plotted for a satisfactory number of points. $Q_{DF}$ is then determined graphically on the Q–V diagram.

Either the computed or the estimated $Q_{DF}$ can be used for determining distortion.

Step 4. As indicated above, $BER_{BB}$ comprises error information on the noise introduced by the $T_1$-$R_1$ pair. This $BER_{BB}$ is measured using again DMU 1 connected as shown in FIG. 2B. The information signal $S_{IN}$ is applied on the modulating input 21 of transmitter $T_i$, rather than the test signal from generator 34. The signal on channel $\lambda_1$, which is now the signal transported by this channel under normal conditions of operation, is re-routed to the input of VOA 2 so that it travels from transmitter $T_1$ to receiver $R_1$ on an alternate distortion-free path. Traffic on all other channels remains unaffected. The power of the signal is adjusted using VOAs 2 and 23 to obtain $P_O$ on power meter 31 in measuring point 16, while the noise level is adjusted using VOA 5 to obtain $OSNR_O$ on spectrometer 32 in point 16. When in the operating point, the value of $BER_{BB}$ is measured on output 17 with BER measuring unit 33.

$Q_{BB}$ is then calculated using formula (2), and it contains information introduced by the noise of the $T_1$-$R_1$ pair.

Step 5. The difference between $Q_{DF}$ and $Q_{BB}$ gives the distortion introduced by the $T_1$-$R_1$ pair, and is denoted by $D_{TR}$.

$$D_{TR}=10^{log10(Q_{BB}/Q_{DF})} \quad (4)$$

Step 6. A Q value ($Q_M$) is measured in the operating point with the system connected as shown in FIG. 2A. $Q_M$ comprises error information about the noise and distortion introduced into the information signal along the entire path.

Step 7. The difference between $Q_M$ and $Q_{BB}$ is representative of the distortion introduced by link 100, and is denoted in this specification by $D_L$. This difference is calculated using formula:

$$D_L=10^{log10(Q_M/Q_{BB})} \quad (3)$$

Step 8. The total distortion over $T_i$-$R_i$ path is the sum of $D_{TR}$ and $D_{BB}$ and is denoted herein with $D_P$.

$$D_P=D_{TR}+D_L \quad (5)$$

$D_P$ may also be calculated by comparing $Q_M$ and $Q_{DF}$ according to formula:

$$D_P=10^{log10(Q_M/Q_{DF})} \quad (6)$$

Experiments were conducted on a five span OC-192 multi-wavelength configuration as shown in FIG. 1B, having a loss of 23 dB/span. The power of the signal in the operating point was set at −11.5 dBm. $BER_{DF}$ was measured with the embodiment of FIG. 2B using the 'long 1s' and 'long 0s' method The results are illustrated in Table 1.

TABLE 1

| Case | System OC-192 | $OSNR_O$ (dB) | $P_O$ (dBm) | $Q_M$ | $Q_{BB}$ | $Q_{DF}$ | $D_L$ (dBQ) | $D_{TR}$ (dBQ) | $D_P$ (dBQ) |
|---|---|---|---|---|---|---|---|---|---|
| 1. | 4λ, λ = 1528 nm | 21.1 | −11.5 | 8.2 | 7.6 | 20 | −0.33 | 4.2 | 3.87 |
| 2. | 4λ, λ = 1533 nm | 19.1 | −11.5 | 6.8 | 5.75 | 15.7 | −0.73 | 4.36 | 3.63 |
| 3. | 4λ, λ = 1528 nm | 23.3 | −11.5 | 9.2 | Not meas. | 26 | N/A | N/A | 4.51 |

Figure 3:
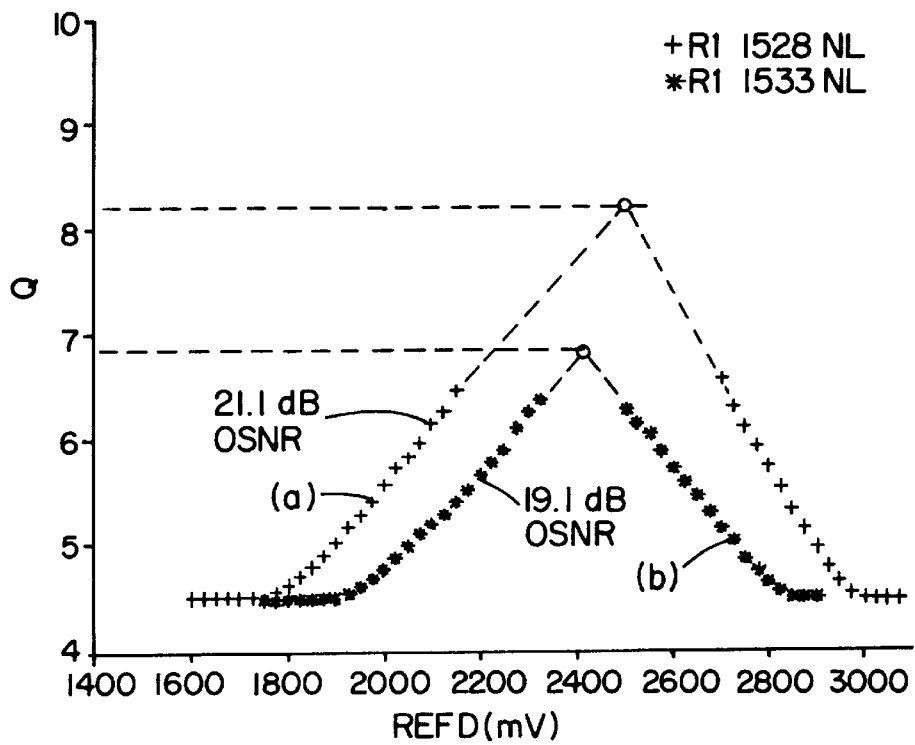
FIG. 3 is a noise-loaded Q–V diagram for determining $Q_M$ as shown in FIG. 2A.
Figure 4:
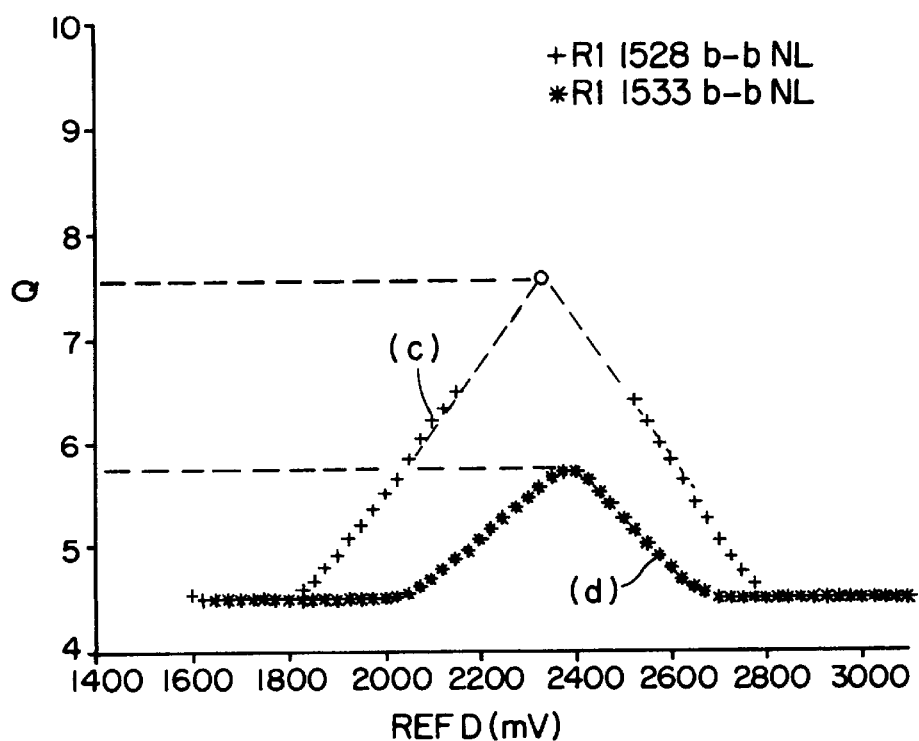
FIG. 4 is a noise-loaded Q–V diagram for determining $Q_{BB}$ and $Q_{DF}$ measured as shown in FIG. 2C.

FIGS. 3 and 4 are Q–V diagrams illustrating Q's obtained for cases 1 and 2 showing measurements for two different channels $\lambda_1$ and $\lambda_2$ of the 4-λ OC-192 five-span optical transmission system configuration of FIG. 1B. The noise floor for these measurements was raised to lower the OSNR, for obtaining the BER values corresponding to a Q value in the vicinity of 7.

Diagrams (a) and (b) on FIG. 3 show $Q_M$, while diagrams (c) and (d) on FIG. 4 show $Q_{BB}$. Again, the measurements were effected for the same $P_O$, $OSNR_O$ operating point, by varying the receiver reference voltage $V_{Ref}$.

For case 1, a $Q_M$ of 8.2 was measured for channel $\lambda_1$=1528 nm, where the signal at the output of link 100 was noise loaded to an $OSNR_O$ of 21.1 dB. This value is obtained graphically by extrapolation, as shown by the intersection of the dotted lines prolonging the flanks of the Q–V diagram (a). $Q_{BB}$ obtained for this measurement is 7.6, as seen on the respective BERV diagram (c) on FIG. 4. $D_L$ and $D_{TR}$ were then calculated applying formulae (3) and (4). For this case, the pair distortion penalty is 0.33 dBQ larger than the path distortion penalty $D_P$.

Case 2 provides the measurements for a channel $\lambda_2$=1533 nm, where the signal at the output of link 100 was noise loaded to an $OSNR_O$ of $_{19.1}$ dB. A $Q_M$ of 6.8 was obtained graphically as shown by the intersection of the dotted lines prolonging the flanks of the BERV diagram (b) on FIG. 3. $Q_{BB}$ obtained for this measurement was 5.75, shown on FIG. 4 as diagram (d).

Case 3 provides the measurements for channel $\lambda_1$, where the signal at the output of link 100 was noise loaded to an $OSNR_O$ of 23.3 dB, which is close to that of case 1. $Q_{BB}$ was not measured for this configuration.

While the invention has been described with reference to particular example embodiments, further modifications and improvements which will occur to those skilled in the art, may be made within the purview of the appended claims, without departing from the scope of the invention in its broader aspect.

I claim:

1. A method for measuring the distortion penalty imposed on an information signal travelling on an optical transmission path of a transmitter, a receiver, and a transmission link, said method comprising the steps of:

(a) lowering the Q-factor of said transmission path to a value of interest $Q_O$;

(b) determining an operating point (OP) for said transmission path;

(c) in said OP, measuring a first parameter including information on errors in said information signal due to the noise cumulated along said path;

(d) in said OP, measuring a second parameter including information on errors in said information signal due to the noise cumulated along said path and to distortion introduced by said transmitter and said receiver;

(e) calculating a pair distortion penalty ($D_{TR}$) for said receiver and said transmitter by comparing said first parameter with said second parameter.

2. A method as claimed in claim 1, wherein said step (a) comprises:

measuring a trial Q factor ($Q_T$) of said transmission path at the output of said receiver;

comparing said $Q_T$ with said $Q_O$; and adding noise to said information signal until said $Q_T$ is in a predetermined range of said $Q_O$.

3. A method as claimed in claim 2, wherein said predetermined range is ±0.5.

4. A method as claimed in claim 2, wherein said step of adding noise comprises:

disconnecting said link at the optical connection plane of said receiver;

connecting the output of an optical coupler to the optical connection plane of said receiver;

connecting said transmission link to a first input of said optical coupler through a first variable optical amplifier (VOA);

connecting a noise source to a second input of said optical coupler through a second VOA; and adjusting the level of noise in said information signal with said second VOA.

5. A method as claimed in claim 1, wherein said step (b) comprises:

measuring the power ($P_O$) of said information signal at the optical connection plane of said receiver; and measuring the optical signal-to-noise ratio ($OSNR_O$) of said information signal at the optical connection plane of said receiver.

6. A method as claimed in claim 5, wherein said step (c) comprises:

replacing said information signal with a test signal selected to present negligible data rate distortions;

by-passing said transmission link by connecting the output of said transmitter to the input of said receiver;

adjusting said test signal to replicate said OP; and determining said first parameter for said test signal in said OP.

7. A method as claimed in claim 6, wherein said step of adjusting comprises:

adjusting the power of said test signal to measure $P_O$ at the input of said receiver; and adding noise to said test signal to measure said $OSNR_O$ at the input of said receiver.

8. A method as claimed in claim 1, wherein said step (d) comprises:

by-passing said transmission link by connecting the optical connection plane of said transmitter to the input of said receiver;

adjusting said information signal to replicate said OP; and determining said second parameter for said information signal in said OP.

9. A method as claimed in claim 6, wherein said step of adjusting comprises:

adjusting the power of said information signal to measure $P_O$ at the input of said receiver; and adding noise to said information signal to measure said $OSNR_O$ at the input of said receiver.

10. A method as claimed in claim 6, wherein said test signal comprises a data stream of 'long 1s' and 'long 0s'.

11. A method as claimed in claim 1, wherein said first parameter is a distortion-free Q factor ($Q_{DF}$) estimated at the output of said receiver.

12. A method as claimed in claim 11, wherein said second parameter is a back-to-back Q factor ($Q_{BB}$) estimated at the output of said receiver.

13. A method as claimed in claim 12, wherein step (e) comprises substituting said $Q_{BB}$ and $Q_{DF}$ in the formula:

$$D_{TR}=10^{log10(Q_{BB}/Q_{DF})}$$

14. A method as claimed in claim 1, further comprising the steps of:

determining said $D_{TR}$ for a plurality of transmitter-receiver pairs;

comparing each said $D_{TR}$ with a provisioned $D_{Prov}$; and selecting a transmitter-receiver pair having said $D_{TR}$ less than said $D_{Prov}$.

15. A method as claimed in claim 1, further comprising the step of measuring a third parameter in said OP, said third parameter including information on noise and distortion for said transmission path.

16. A method as claimed in claim 15, wherein said third parameter is a measured Q ($Q_M$) estimated at the output of said receiver.

17. A method as claimed in claim 16, further comprising the step of comparing said $Q_M$ with said $Q_{BB}$ for determining a link distortion penalty ($D_L$) accounting for the distortion introduced by all network elements and fiber spans connected between said transmitter and said receiver.

18. A method as claimed in claim 16, further comprising the step of comparing said $Q_M$ with said $Q_{DF}$ for determining a path distortion penalty ($D_P$) accounting for the distortion introduced by said transmitter, said receiver and all network elements and fiber spans connected between said transmitter and said receiver.

19. A method for equalizing the noise margin for a plurality (i) of transmission channels, each channel $\lambda_i$ transporting an information signal $S_i$ between a transmitter $T_i$ and a receiver $R_i$, said method comprising the steps of:

for each channel $\lambda_i$, lowering the Q-factor of said transmission channel to a value of interest $Q_O$;

measuring the power ($P_{Oi}$) of said information signal at the optical connection plane of said receiver;

measuring the optical signal-to-noise ratio ($OSNR_{Oi}$) of said information signal at the optical connection plane of said receiver;

comparing said $OSNR_{Oi}$ to a provisioned $OSNR_{Prov}$;

if all said $OSNR_O$ is for all said transmission channels $\lambda_i$ are less than said $OSNR_{Prov}$, adjusting the noise for each channel to an equalized $OSNR_{EQ}$;

if at least one $OSNR_{Oi}$ is greater than said $OSNR_{Prov}$, effecting an equalization of channels based on BER measurement.

20. A method as claimed in claim 1, wherein any of said step (c) and step (d) comprises:

applying a plurality of reference voltage ($V_{Ref}$) values to said receiver and measuring a bit error rate (BER) value at the output of said receiver for each $V_{Ref}$ value;

calculating a corresponding Q factor for each said BER value;

plotting a Q–$V_{Ref}$ diagram; and estimating a most probable value of the Q factor on said BERV diagram.

21. A method as claimed in claim 20, wherein said step of estimating comprises:

prolonging the flanks of said Q–V diagram to obtain a point of intersection;

determining the Q value corresponding to said point of intersection as said most probable value of the Q; and using said most probable value as a respective one of said first parameter and said second parameter.

* * * * *